US012625930B2

(12) United States Patent
Yin

(10) Patent No.: US 12,625,930 B2
(45) Date of Patent: May 12, 2026

(54) SCREEN UNLOCKING METHOD AND APPARATUS, AND ELECTRONIC DEVICE

(71) Applicant: VIVO MOBILE COMMUNICATION CO., LTD., Dongguan (CN)

(72) Inventor: Li Yin, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 189 days.

(21) Appl. No.: 18/409,783

(22) Filed: Jan. 10, 2024

(65) Prior Publication Data

US 2024/0143711 A1    May 2, 2024

Related U.S. Application Data

(63) Continuation of application No. PCT/CN2022/105206, filed on Jul. 12, 2022.

(30) Foreign Application Priority Data

Jul. 14, 2021    (CN) .......................... 202110795267.4

(51) Int. Cl.
*G06F 21/31* (2013.01)
(52) U.S. Cl.
CPC .................................... *G06F 21/31* (2013.01)
(58) Field of Classification Search
None
See application file for complete search history.

(56) References Cited

U.S. PATENT DOCUMENTS

| 2014/0101752 A1* | 4/2014 | Hrybyk | ................... G06F 21/31 726/17 |
| 2014/0109018 A1* | 4/2014 | Casey | ................. G06F 3/04883 715/863 |
| 2015/0116218 A1 | 4/2015 | Yang et al. | |
| 2015/0220724 A1* | 8/2015 | Kwak | ................. G06F 3/04817 726/19 |

(Continued)

FOREIGN PATENT DOCUMENTS

| CN | 105607457 A | 5/2016 |
| CN | 106249993 A | 12/2016 |

(Continued)

OTHER PUBLICATIONS

Finding the Angle Between the Hands of a Clock by ab; https://dev.to/a_b_102931/finding-the-angle-between-the-hands-of-a-clock-2lg1; Jul. 22, 2020; retrieved Sep. 11, 2025 (Year: 2020).*

(Continued)

*Primary Examiner* — James R Turchen
(74) *Attorney, Agent, or Firm* — IPX PLLC

(57) ABSTRACT

This application discloses a screen unlocking method and apparatus, and an electronic device, and pertains to the technical field of terminal devices. The screen unlocking method includes: obtaining a first position of a first hand in a case that a target interface is displayed on a screen of an electronic device, where the target interface includes the first hand; determining a first preset unlocking condition corresponding to the first position; receiving an unlocking input performed by a user; and unlocking the electronic device in response to the unlocking input in a case that the unlocking input matches the first preset unlocking condition.

15 Claims, 7 Drawing Sheets

(56) References Cited

U.S. PATENT DOCUMENTS

| | | | | | |
|---|---|---|---|---|---|
| 2017/0337554 A1* | 11/2017 | Mokhasi | ............. | G06F 3/04847 |
| 2018/0248990 A1* | 8/2018 | Jung | ..................... | G06F 3/0236 |
| 2021/0089639 A1* | 3/2021 | Remillet | ................ | G06F 21/32 |

FOREIGN PATENT DOCUMENTS

| | | | | | |
|---|---|---|---|---|---|
| CN | 108319843 A | 7/2018 | | |
| CN | 113468502 A | 10/2021 | | |
| EP | 2639733 A1 * | 9/2013 | ............. | G06F 21/36 |

OTHER PUBLICATIONS

International Search Report issued in corresponding International Application No. PCT/CN2022/105206, mailed Oct. 10, 2022, 4 pages.

* cited by examiner

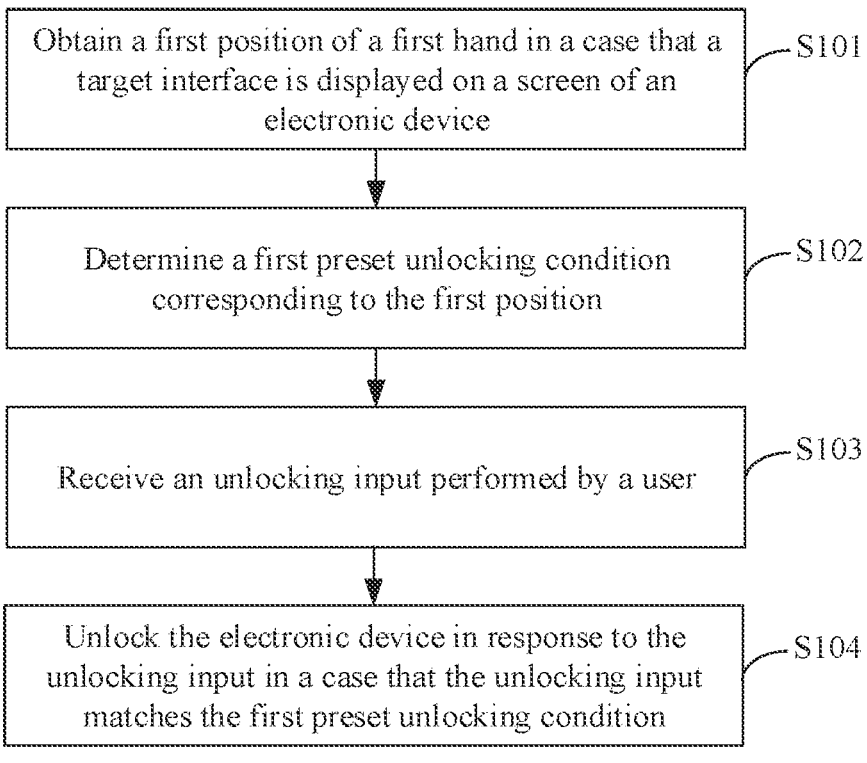

| Obtain a first position of a first hand in a case that a target interface is displayed on a screen of an electronic device | S101 |

| Determine a first preset unlocking condition corresponding to the first position | S102 |

| Receive an unlocking input performed by a user | S103 |

| Unlock the electronic device in response to the unlocking input in a case that the unlocking input matches the first preset unlocking condition | S104 |

FIG. 1

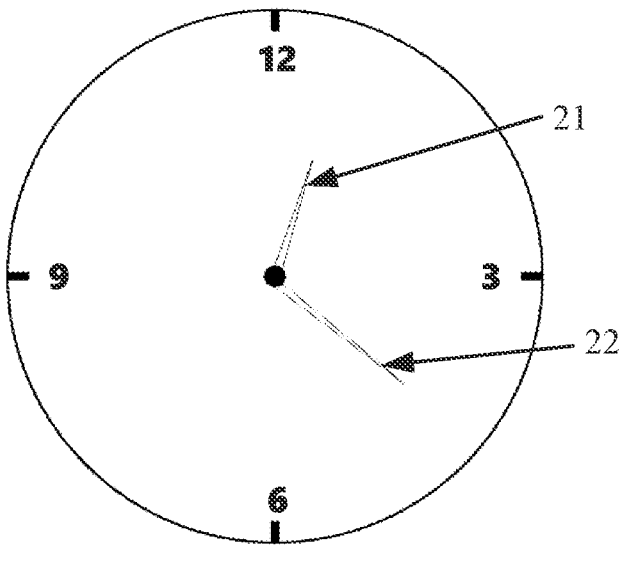

FIG. 2

SCREEN UNLOCKING METHOD AND APPARATUS, AND ELECTRONIC DEVICE

CROSS-REFERENCE TO RELATED APPLICATIONS

This application is a continuation of International Application No. PCT/CN2022/105206, filed Jul. 12, 2022, which claims priority to Chinese Patent Application No. 202110795267.4, filed Jul. 14, 2021. The entire contents of each of the above-referenced applications are expressly incorporated herein by reference.

TECHNICAL FIELD

This application relates to the technical field of terminal devices, and specifically relates to a screen unlocking method and apparatus, and an electronic device.

BACKGROUND

With the popularity of wearable devices, smart watches have entered people's lives and are favored by users due to information processing capabilities and compliance with basic watch technology requirements.

Currently, smart watches usually allow users to enter interfaces through sliding or double tapping. With the development of wearable devices, the amount of data stored inside is increasing, including some private data. Therefore, it is necessary to lock the device. The existing sliding unlocking method is relatively simple, affecting user experience.

SUMMARY

Embodiments of this application provide a screen unlocking method and apparatus, and an electronic device.

According to a first aspect, a screen unlocking method is provided, including:

obtaining a first position of a first hand in a case that a target interface is displayed on a screen of an electronic device, where the target interface includes the first hand;

determining a first preset unlocking condition corresponding to the first position;

receiving an unlocking input performed by a user; and unlocking the electronic device in response to the unlocking input in a case that the unlocking input matches the first preset unlocking condition.

According to a second aspect, a screen unlocking apparatus is provided, including:

a first obtaining module, configured to obtain a first position of a first hand in a case that a target interface is displayed on a screen of an electronic device, where the target interface includes the first hand;

a first determining module, configured to determine a first preset unlocking condition corresponding to the first position;

a receiving module, configured to receive an unlocking input performed by a user; and a first execution module, configured to unlock the electronic device in response to the unlocking input in a case that the unlocking input matches the first preset unlocking condition.

According to a third aspect, an electronic device is provided. The electronic device includes a processor, a memory, and a program or an instruction that is stored in the memory and that can be run on the processor, and the program or the instruction is executed by the processor to implement the steps of the method according to the first aspect.

According to a fourth aspect, a readable storage medium is provided. The readable storage medium stores a program or an instruction, and the program or the instruction is executed by a processor to implement the steps of the method according to the first aspect.

According to a fifth aspect, an embodiment of this application provides a chip. The chip includes a processor and a communication interface, the communication interface is coupled to the processor, and the processor is configured to run a program or an instruction to implement the method according to the first aspect.

According to a sixth aspect, an embodiment of this application provides a computer program product. The computer program product is executed by at least one processor to implement the method according to the first aspect.

BRIEF DESCRIPTION OF DRAWINGS

The accompanying drawings described herein are intended to provide a further understanding of the present application, and constitute a part of the present application. The illustrative embodiments of the present application and descriptions thereof are intended to describe the present application, and do not constitute limitations on the present application. In the accompanying drawings:

FIG. 1 is a flowchart of a screen unlocking method according to an embodiment of this application;

FIG. 2 is a schematic diagram of an interface of an electronic device according to an embodiment of this application;

DETAILED DESCRIPTION

Figure 3:
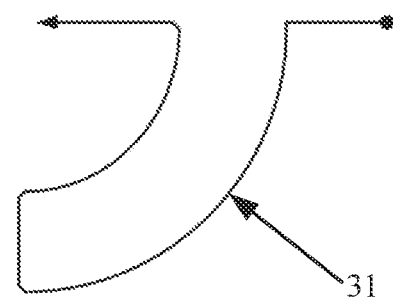
FIG. 3 is a schematic diagram of an unlocking track according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to FIG. 1 to FIG. 16, the following describes in detail a screen unlocking method and apparatus, and an electronic device provided in the embodiments of this application by using embodiments and application scenarios thereof.

As shown in FIG. 1, an embodiment of this application provides a screen unlocking method. The screen unlocking method may include content shown in S101 to S104.

In S101, a first position of a first hand is obtained in a case that a target interface is displayed on a screen of an electronic device.

The target interface includes the first hand.

It should be noted that the electronic device may be a smart watch, or may be a mobile phone. In a case that the electronic device is a mobile phone, the first hand may be a hand in a watch face on a display interface of the mobile phone. In a case that the electronic device is a smart watch, the hand may be a hand in a watch face of the smart watch. The watch face may have two hands such as an hour hand and a minute hand, or may have three hands such as an hour hand, a minute hand, and a second hand. The first hand in this application may be one of the hands, or may be two of the hands. This needs to be determined according to an actual situation.

In S102, a first preset unlocking condition corresponding to the first position is determined.

An unlocking condition is related to a position of the first hand, and a current unlocking condition may be determined according to the obtained position of the hand.

In S103, an unlocking input performed by a user is received.

It should be noted that in this embodiment, there is no time sequence between S103 and S101 to S102. In this embodiment, in S101, obtaining may be performed at intervals, or may be performed immediately when the unlocking input performed by the user is received. This is not specifically limited in this embodiment of this application.

The receiving an unlocking input performed by a user includes starting from a moment at which the user is in contact with the screen of the electronic device, that is, a first time point, and ending until a moment at which the user leaves the screen.

In S104, the electronic device is unlocked in response to the unlocking input in a case that the unlocking input matches the first preset unlocking condition.

It can be understood that, that the unlocking input matches the first preset unlocking condition may mean that an unlocking track input by the user on the target interface matches a track corresponding to the first preset unlocking condition, or a graph formed by the unlocking track matches a graph corresponding to the first preset unlocking condition. The unlocking track may be a track moved by the user on the screen from a moment at which the user touches screen to a moment at which the user leaves the screen. The track may form a graph, and the graph is compared with a preset graph. If two graphs are the same or have a relatively high degree of similarity, it indicates that the unlocking input matches the first preset unlocking condition.

In this embodiment of this application, first, a first position of a first hand is obtained in a case that a target interface is displayed on a screen of an electronic device, where the target interface includes a first hand; then a first preset unlocking condition corresponding to the first position is determined; an unlocking input performed by a user is received; and the electronic device is unlocked in response to the unlocking input in a case that the unlocking input matches the first preset unlocking condition. In this embodiment of this application, the unlocking condition is combined with the hand on the target interface of the electronic device, and unlocking condition is associated with the hand, so that unlocking is diversified and an unlocking process is more interesting, thereby improving user experience.

In a possible implementation of this application, the target interface includes a watch face, and the first position is a position of the first hand in the watch face. Correspondingly, after the first position of the first hand is obtained, the screen unlocking method may further include: determining an interval in which the first position is located. The watch face may include a plurality of intervals, the intervals correspond to different preset unlocking conditions, and the preset unlocking condition includes the first preset unlocking condition.

In this embodiment of this application, the watch face is displayed on the target interface. The first position may be a position of the first hand on the watch face. The interval in which the first position is located may be determined. Because each interval corresponds to one preset unlocking condition, the first preset unlocking condition corresponding to the first position may be further determined. It can be understood that the first preset unlocking condition is a preset unlocking condition corresponding to the interval in which the first position is located, and the unlocking condition is combined with the interval in which the hand is located, so that unlocking is more diversified, thereby improving enjoyment of unlocking.

It can be understood that there are related identifiers in positions of a number 0, a number 3, a number 6, and a number 9 on the watch face. Starting from the position of the number 0 on the watch face, the watch face may be divided into four intervals, that is, an interval from the number 0 to the number 3, an interval from the number 3 to the number 6, an interval from the number 6 to the number 9, and an interval from the number 9 to the number 12. The four intervals may be separately named as a first interval (a range from the number 0 to the number 3), a second interval (a range from the number 3 to the number 6), a third interval (a range from the number 6 to the number 9), and a fourth interval (a range from the number 9 to the number 12), where the number 0 is generally overlapped with the number 12, and the number 12 is usually identified. It can be understood that different intervals at which the point is located correspond to different preset unlocking conditions. For example, in a case that the point is in the first interval, the preset unlocking condition is a condition A, and in a case that the hand is in the second interval, the preset unlocking condition is a condition B.

For example, as shown in FIG. 2, a target interface is displayed in FIG. 2, and the target interface includes an hour hand 21 and a minute hand 22, where the first hand is the minute hand 22. FIG. 2 is a schematic diagram in which the first hand (the minute hand 22) is in the second interval. It can be understood that a preset unlocking condition corresponding to the interval is preset as follows: The user draws, on the screen, an unlocking track 31 shown in FIG. 3. In a case that the first hand (the minute hand 22) is in the second interval, the first preset unlocking condition is that the unlocking track of the user matches the unlocking track 31.

Figure 4:
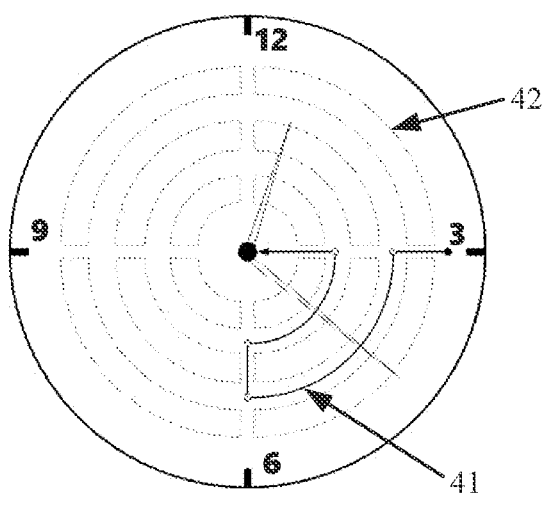
FIG. 4 is a schematic diagram of an unlocking input according to an embodiment of this application.

FIG. 4 is a schematic diagram in which the user performs unlocking by using an unlocking track in a case that the first hand is in the second interval. As shown in FIG. 4, the user draws an unlocking track 41. Because the unlocking track 41 is the same as the unlocking track 31 preset in FIG. 3, that is, the unlocking input performed by the user matches the first preset unlocking condition, the electronic device is unlocked. If the unlocking track drawn by the user is another track and is different from the unlocking track 31 preset in FIG. 3, that is, the unlocking input performed by the user does not match the first preset unlocking condition, the electronic device keeps in a locked state.

Figure 5:
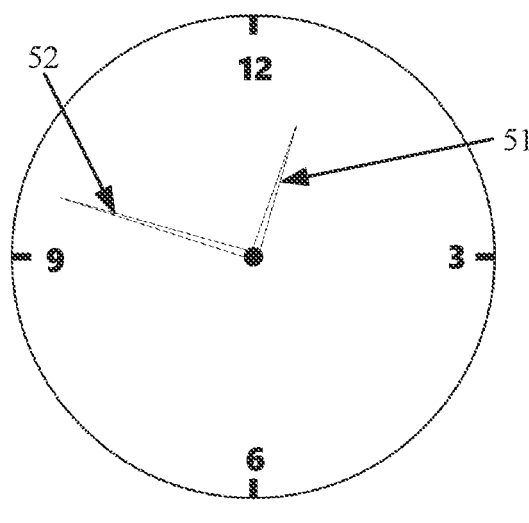
FIG. 5 is a schematic diagram of an interface of another electronic device according to an embodiment of this application.
Figure 6:
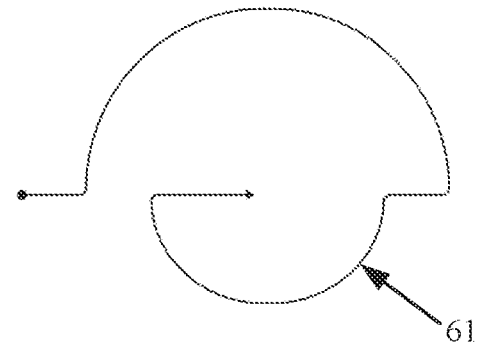
FIG. 6 is a schematic diagram of another unlocking track according to an embodiment of this application.

For example, as shown in FIG. 5, a target interface is displayed in FIG. 5, and the target interface includes an hour hand 51 and a minute hand 52, where the first hand is the minute hand 52. FIG. 5 is a schematic diagram in which the first hand (the minute hand 52) is in the fourth interval. It can be understood that a preset unlocking condition of the interval is preset as follows: The user draws an unlocking track 61 shown in FIG. 6 on the screen. In a case that the first hand (the minute hand 52) is in the fourth interval, the first preset unlocking condition is that the unlocking track of the user matches the unlocking track 61.

Figure 7:
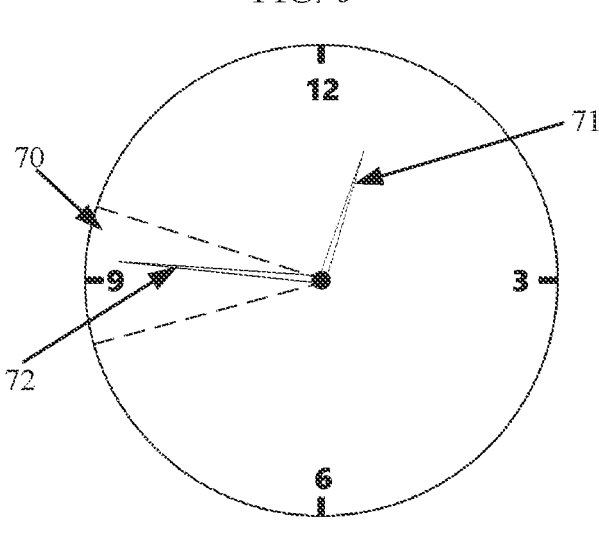
FIG. 7 is a schematic diagram of an interface of an electronic device according to an embodiment of this application.

Further, because intervals are adjacent, it is relatively difficult to determine a position of the hand in an adjacent area between two intervals. In this case, when the first position of the first hand is near a critical position, unlocking may be performed by using any one of preset unlocking conditions corresponding to the two adjacent intervals. For example, as shown in FIG. 7, a target interface is displayed in FIG. 7, and the target interface includes an hour hand 71 and a minute hand 72, where the first hand is the minute hand 72. In FIG. 7, the third interval and the fourth interval are two adjacent intervals. In this case, an adjacent area of the two adjacent intervals is an adjacent area 70, and the first hand is the minute hand 72 in FIG. 7. It can be learned that the minute hand 72 is located in the adjacent area 70. Both a preset unlocking condition corresponding to the third interval and a preset unlocking condition corresponding to the fourth interval may be determined as the first preset unlocking condition, and matching between the unlocking input performed by the user and a preset unlocking condition corresponding to any one area can unlock the electronic device.

That is, when the first position is a position in which the minute hand 72 is located (a position in which the identifier of the number 9 is located) in FIG. 7, the corresponding first preset unlocking condition may be the preset unlocking condition corresponding to the third interval (an area between the number 6 and the number 9), or may be the unlocking condition corresponding to the fourth interval (an area between the number 9 and the number 12).

Further, in a case that the user touches the screen, an unlocking auxiliary line may be displayed on the screen, for example, an unlocking auxiliary line 42 in FIG. 4, so that the user better draws an unlocking track corresponding to the first preset unlocking condition, thereby facilitating use by the user. The auxiliary line may be of a style shown in FIG. 4, or may be of another style. This may be determined according to an unlocking track.

In a possible implementation of this application, the first hand includes a first sub-hand and a second sub-hand, and the first position is a relative position between the first sub-hand and the second sub-hand.

Correspondingly, the determining a first preset unlocking condition corresponding to the first position may include the following steps:

determining an included angle between the first sub-hand and the second sub-hand according to the relative position between the first sub-hand and the second sub-hand; and determining the first preset unlocking condition corresponding to the first position according to the included angle.

For example, in a case that the target interface includes an hour hand, a minute hand, and a second hand, the first sub-hand may be the minute hand, the second sub-hand may be the second hand, and the first position is a relative position between the minute hand and the second hand.

In other words, an included angle formed by two sub-hands may be determined according to a relative position between the two sub-hands, to determine the first preset unlocking condition corresponding to the first position. It can be understood that different included angles correspond to different preset unlocking conditions, so that unlocking is diversified and an unlocking process is more interesting, thereby improving user experience.

It can be understood that several included angle ranges may be preset, and each included angle range corresponds to one preset unlocking condition.

Figure 8:
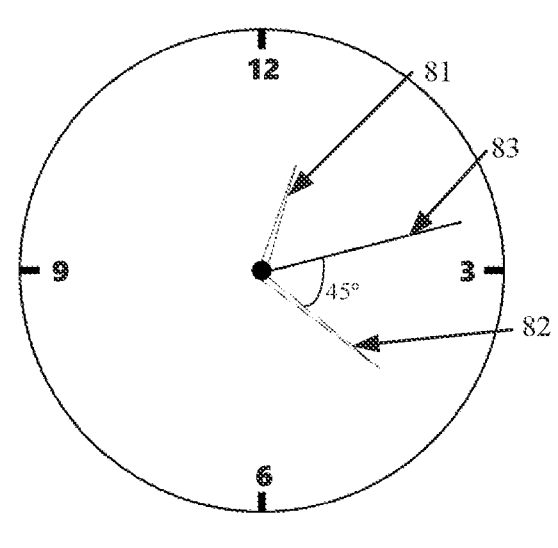
FIG. 8 is a schematic diagram of an interface of another electronic device according to an embodiment of this application.
Figure 9:
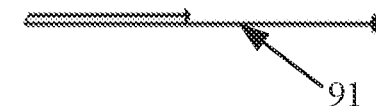
FIG. 9 is a schematic diagram of another unlocking input according to an embodiment of this application.

For example, FIG. 8 is a schematic diagram of two sub-hands according to an embodiment of this application. As shown in FIG. 8, a target interface includes an hour hand 81, a minute hand 82, and a second hand 83, where the minute hand 82 and the second hand 83 are first hands. Further, the minute hand 82 is the first sub-hand in the first hand, and the second hand 83 is the second sub-hand in the first hand. As shown in FIG. 8, an included angle between the minute hand 82 and the second hand 83 is 45°, and in a preset included angle range, if the included angle is in a range of (30°, 60° ], a preset unlocking condition corresponding to the included angle range is that the user draws an unlocking track 91 shown in FIG. 9.

Figure 10:
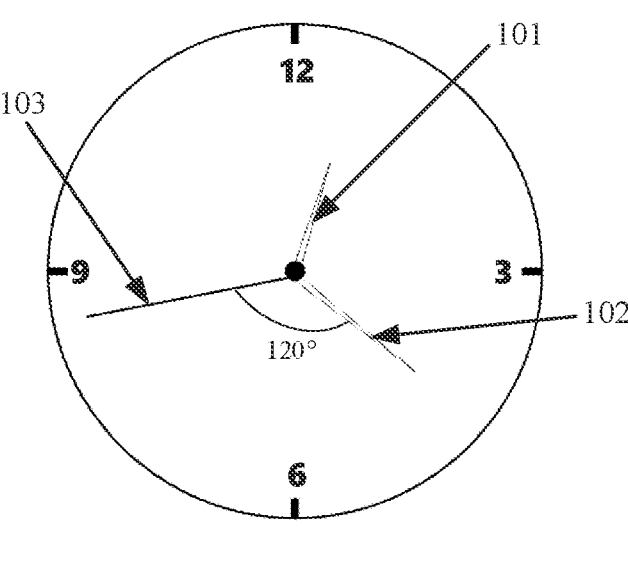
FIG. 10 is a schematic diagram of an interface of another electronic device according to an embodiment of this application.
Figure 11:
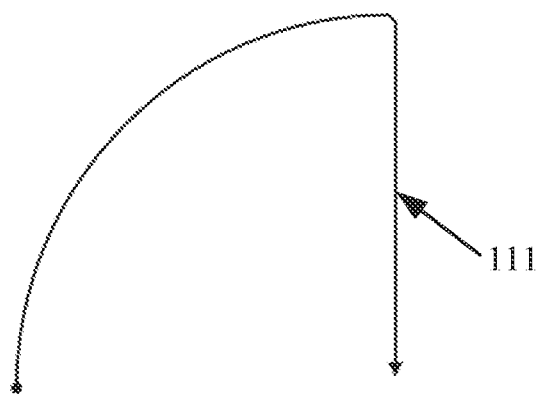
FIG. 11 is a schematic diagram of another unlocking input according to an embodiment of this application.

For example, FIG. 10 is a schematic diagram of two sub-hands according to an embodiment of this application. A target interface is displayed in FIG. 10, and the target interface includes an hour hand 101, a minute hand 102, and a second hand 103. The minute hand 102 and the second hand 103 are the first hand. Further, the minute hand 102 is the first sub-hand in the first hand, and the second hand 103 is the second sub-hand. As shown in FIG. 10, an included angle between the minute hand 102 and the second hand 103 is 120°, and in a preset included angle range, if the included angle is in a range of (90°, 180° ]), a preset unlocking condition corresponding to the included angle range is that the user draws an unlocked track 111 shown in FIG. 11. If the unlocking track drawn by the user does not match the unlocking track 111, the electronic device continues to be in a locked state.

In a possible implementation of this application, the included angle may include a first included angle and a second included angle, and a sum of the first included angle and the second included angle is 360°.

It should be noted that the first included angle and the second included angle are formed by the first sub-hand and the second sub-hand at a same moment instead of different moments, that is, are not formed after a position change. In other words, at a moment, when the first sub-hand and the second sub-hand are respectively in a position, the first sub-hand and the second sub-hand may form two angles, and a sum of the two included angles is 360°.

Figure 12:
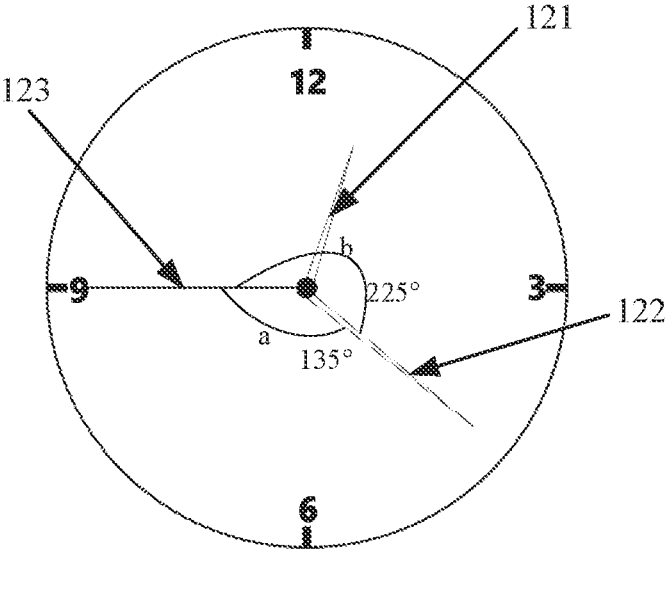
FIG. 12 is a schematic diagram of an interface of another electronic device according to an embodiment of this application.
Figure 13:
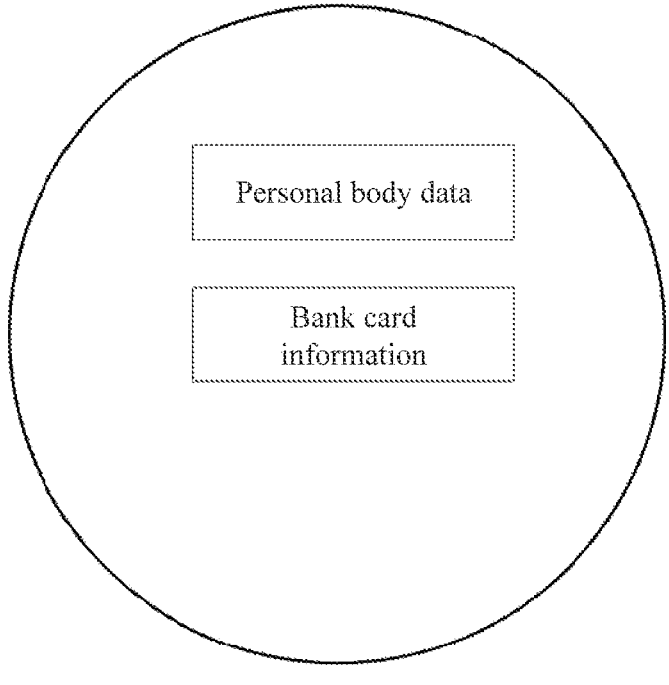
FIG. 13 is a schematic diagram of an unlocked screen according to an embodiment of this application.
Figure 14:
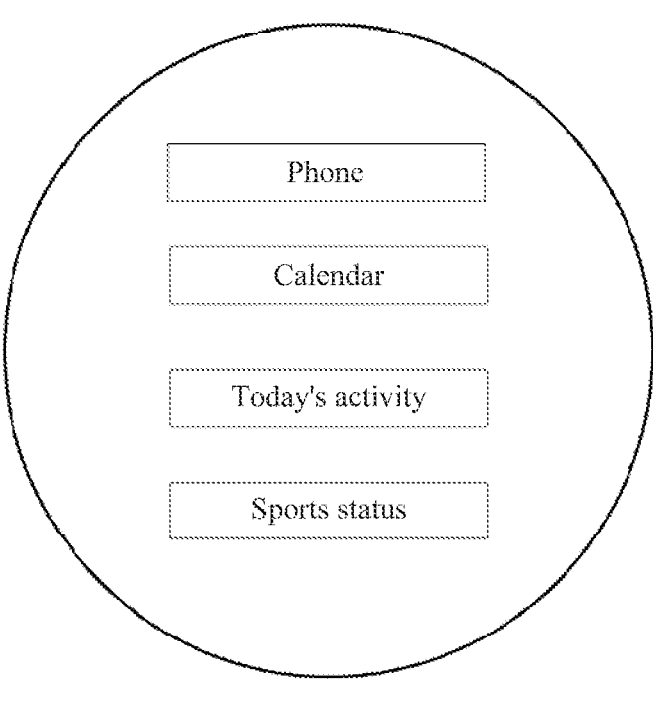
FIG. 14 is another schematic diagram of an unlocked screen according to an embodiment of this application.

For example, as shown in FIG. 12, a target interface is displayed in FIG. 12, and the target interface includes an hour hand 121, a minute hand 122, and a second hand 123, where the minute hand 122 and the second hand 123 are the first hand. Further, the minute hand 122 is the first sub-hand in the first hand, and the second hand 123 is the second sub-hand in the first hand. As shown in FIG. 12, the first sub-hand and the second sub-hand form two included angles: a first included angle a (135°) and a second included angle b (225°).

Correspondingly, after the electronic device is unlocked, the screen unlocking method may further include the following step:

displaying a first interface in a case that the included angle is the first included angle; or displaying a second interface in a case that the included angle is the second included angle.

The first preset unlocking condition includes a first unlocking condition and a second unlocking condition, the first included angle corresponds to the first unlocking condition, and the second included angle corresponds to the second unlocking condition.

In other words, at a moment, when the two sub-hands are respectively located at a position, two included angles may be formed, and the two included angles correspond to two different unlocking conditions. After the electronic device is unlocked through different unlocking inputs, different interfaces can be displayed. It can be understood that the first interface is different from the second interface. For example, the first interface may be a desktop interface including all icons, and the second interface may be a desktop interface including common icons. In addition, the first interface may be any page of an application A, and the second interface may be any page of an application B.

In this embodiment, because an included angle formed by hands at a same moment may correspond to two different unlocking conditions, different unlocking inputs may be used to display different interfaces after the user enters the electronic device, so that processing in the electronic device after the user performs unlocking is faster, thereby improving user experience.

For example, as shown in FIG. 12, the first included angle a formed by the two sub-hands is 135°, and the second included angle b is 225°. The first unlocking condition corresponding to the first included angle a is that the user draws the unlocking track 91 shown in FIG. 9 on the screen. After unlocking, the user may enter an interface shown in FIG. 13, and privacy data such as personal body data and bank card information are displayed on the interface. The second unlocking condition corresponding to the second included angle b is that the user draws the unlocking track 111 shown in FIG. 11 on the screen. After unlocking, the user may enter an interface shown in FIG. 14, and data such as Phone, Calendar, Today's activity, and Sports status is displayed on the interface.

In this embodiment of this application, two formed included angles correspond to different preset unlocking conditions, so that content that can be viewed after unlocking is restricted, and privacy of the user can be protected, or unlocking can be more interesting. In some embodiments, the content that can be viewed after unlocking may be separately restricted according to values of the two included angles. For example, a smaller included angle corresponds to the first unlocking condition, and a larger included angle corresponds to the second unlocking condition. After the first unlocking condition is used for unlocking, privacy-related content such as body data, bank card information, and payment information may be displayed on the screen. After the second unlocking condition is used for unlocking, non-privacy-related content such as Calendar, Steps, and a phone book may be displayed on the screen.

In a possible implementation of this application, before the electronic device is unlocked in response to the unlocking input in a case that the unlocking input matches the first preset unlocking condition, the screen unlocking method may further include the following content:

obtaining input duration of the unlocking input; and
keeping the electronic device in a locked state in a case that the input duration is greater than preset duration; or detecting matching between the unlocking input and the first preset unlocking condition in a case that the input duration is less than or equal to the preset duration.

In this embodiment, the unlocking input needs to take a certain time, and time does not stop in this time period, that is, the hand moves. Therefore, the user needs to draw the unlocking track within a time period before the unlocking condition changes or within a preset time period. Otherwise, the unlocking fails, and the electronic device continues to be in a locked state. The preset duration is preset, and the user needs to complete the unlocking track within the preset duration, thereby increasing unlocking security.

If the input duration in which the user draws the unlocking track is less than or equal to the preset duration, matching between the unlocking input and the first preset unlocking condition is further detected. In other words, whether the unlocking track is an unlocking track corresponding to the first preset unlocking condition needs to be further determined. If yes, the electronic device is unlocked, or if no, the electronic device keeps in a locked state.

It should be noted that the screen unlocking method provided in the embodiments of this application may be performed by a screen unlocking apparatus or a control module that performs the screen unlocking method in the screen unlocking apparatus. In the embodiments of this application, that the screen unlocking apparatus performs the screen unlocking method is used as an example to describe the screen unlocking apparatus provided in the embodiments of this application.

An embodiment of this application further provides a screen unlocking apparatus, and the apparatus may include a first obtaining module, a first determining module, a receiving module, and a first execution module.

In some embodiments, the first obtaining module is configured to obtain a first position of a first hand in a case that a target interface is displayed on a screen of an electronic device, where the target interface includes the first hand; the first determining module is configured to determine a first preset unlocking condition corresponding to the first position; the receiving module is configured to receive an unlocking input performed by a user; and the first execution module is configured to unlock the electronic device in response to the unlocking input in a case that the unlocking input matches the first preset unlocking condition.

In this embodiment of this application, first, a first obtaining module obtains a first position of a first hand in a case that a target interface is displayed on a screen of an electronic device, where the target interface includes the first hand; and then, a first determining module determines a first preset unlocking condition corresponding to the first position, a receiving module receives an unlocking input performed by a user, and a first execution module unlocks the electronic device in response to the unlocking input in a case that the unlocking input matches the first preset unlocking condition. In this embodiment of this application, the unlocking condition is combined with the hand on the target interface of the electronic device, so that unlocking is diversified and an unlocking process is more interesting, thereby improving user experience.

In a possible implementation of this application, the target interface includes a watch face, and the first position is a position of the first hand in the watch face on the target interface; and the screen unlocking apparatus may further include a second determining module.

The second determining module is configured to determine an interval in which the first position is located, where the watch face includes a plurality of intervals, the intervals correspond to different preset unlocking conditions, and the preset unlocking conditions include the first preset unlocking condition.

In a possible implementation of this application, the first hand includes a first sub-hand and a second sub-hand, and the first position is a relative position between the first sub-hand and the second sub-hand; and the first determining module is configured to: determine an included angle between the first sub-hand and the second sub-hand according to the relative position between the first sub-hand and the second sub-hand; and determine the first preset unlocking condition corresponding to the first position according to the included angle.

In a possible implementation of this application, the included angle includes a first included angle and a second included angle, and a sum of the first included angle and the second included angle is 360°; and the screen unlocking apparatus may further include a first display module and a second display module.

The first display module is configured to display a first interface in a case that the included angle is the first included angle; or the second display module is configured to display a second interface in a case that the included angle is the second included angle, where the first preset unlocking condition includes a first unlocking condition and a second unlocking condition, the first included angle corresponds to the first unlocking condition, and the second included angle corresponds to the second unlocking condition.

In a possible implementation of this application, the screen unlocking apparatus may further include a second obtaining module, a second execution module, and a detection module.

The second obtaining module is configured to obtain input duration of the unlocking input; the second execution module is configured to keep the electronic device in a locked state in a case that the input duration is greater than preset duration; and the detection module is configured to detect matching between the unlocking input and the first preset unlocking condition in a case that the input duration is less than or equal to the preset duration.

The screen unlocking apparatus in this embodiment of this application may be an apparatus, or may be a component, an integrated circuit, or a chip in a terminal.

The screen unlocking apparatus in this embodiment of this application may be an apparatus with an operating system. The operating system may be an Android operating system, an iOS operating system, or another possible operating system. This is not specifically limited in this embodiment of this application.

The screen unlocking apparatus provided in this embodiment of this application can implement the processes implemented in the method embodiment in FIG. 1 to FIG. 12. To avoid repetition, details are not described herein again.

Figure 15:
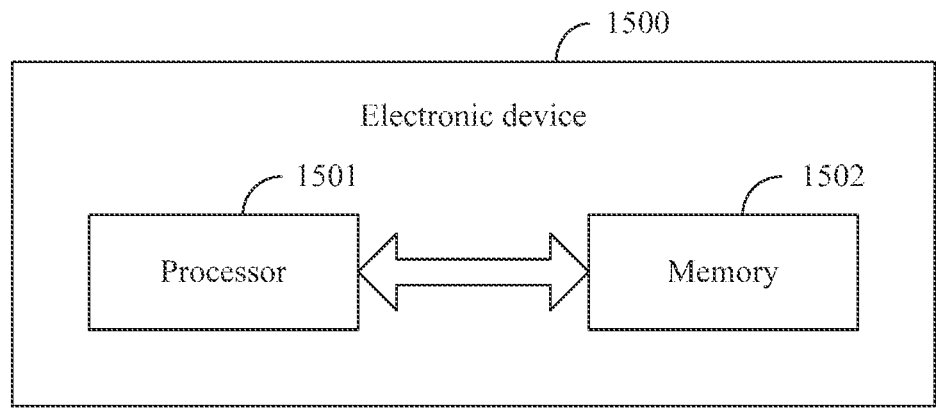
FIG. 15 is a schematic diagram of an electronic device according to an embodiment of this application.

As shown in FIG. 15, an embodiment of this application further provides an electronic device 1500, including a processor 1501, a memory 1502, and a program or an instruction that is stored in the memory 1502 and can be run on the processor 1501. The program or the instruction is executed by the processor 1501 to implement the processes of the foregoing screen unlocking method embodiment of the electronic device and a same technical effect can be achieved. To avoid repetition, details are not described herein again.

Figure 16:
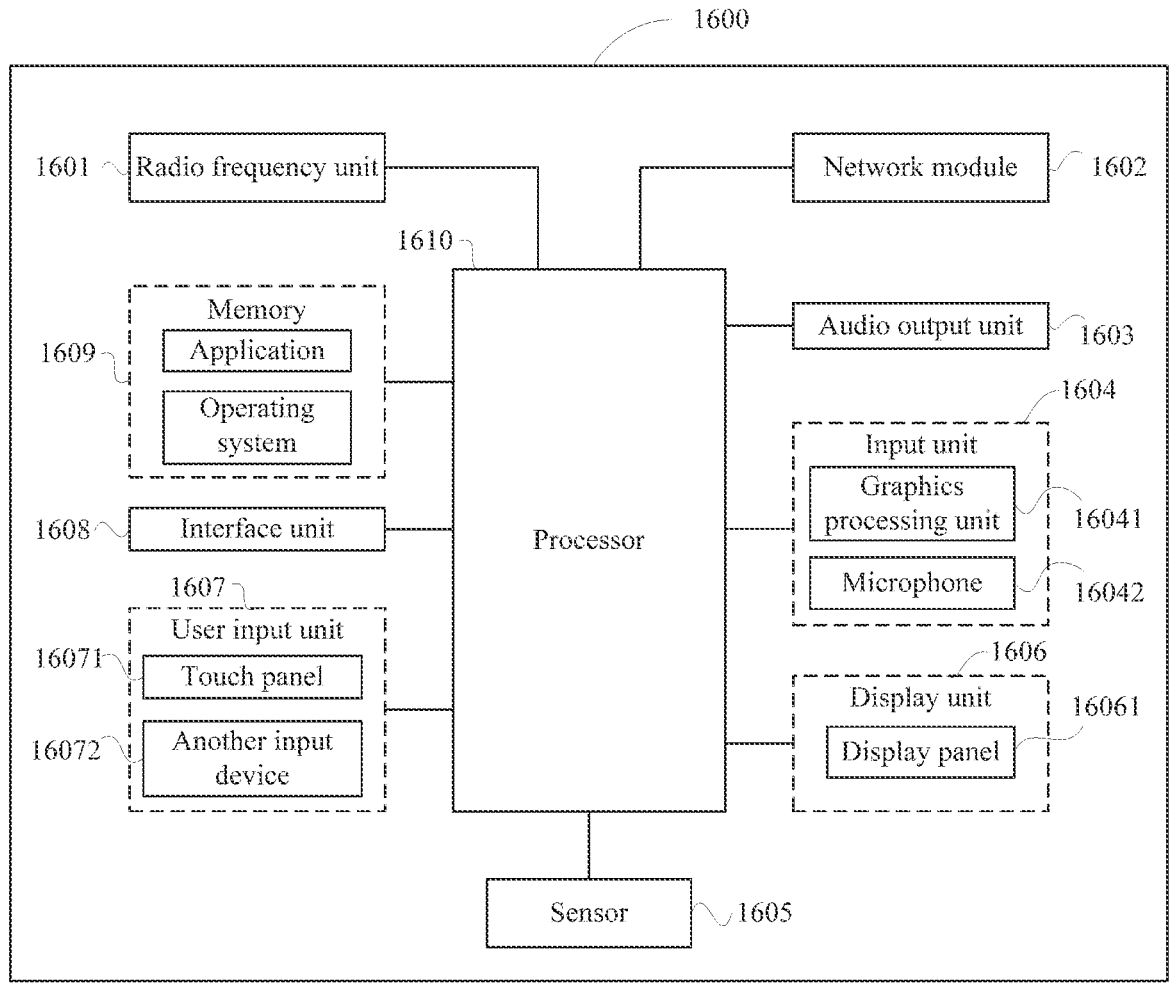
FIG. 16 is a schematic diagram of a hardware structure of an electronic device according to an embodiment of this application.

FIG. 16 is a schematic diagram of a hardware structure of an electronic device according to an embodiment of this application.

An electronic device 1600 includes but is not limited to components such as a radio frequency unit 1601, a network module 1602, an audio output unit 1603, an input unit 1604, a sensor 1605, a display unit 1606, a user input unit 1607, an interface unit 1608, a memory 1609, and a processor 1610.

A person skilled in the art can understand that the electronic device 1600 may further include a power supply (such as a battery) that supplies power to each component. The power supply may be logically connected to the processor 1610 by using a power supply management system, to implement functions such as charging and discharging management, and power consumption management by using the power supply management system. The structure of the electronic device shown in FIG. 16 does not constitute a limitation on the electronic device. The electronic device may include components more or fewer than those shown in the diagram, a combination of some components, or different component arrangements. Details are not described herein.

The processor 1610 is configured to: obtain a first position of a first hand in an electronic device in a case that a target interface is displayed on a screen of the electronic device, where the target interface includes the first hand; determine a first preset unlocking condition corresponding to the first position; receive an unlocking input performed by a user; and unlock the electronic device in response to the unlocking input in a case that the unlocking input matches the first preset unlocking condition.

In this embodiment of this application, a first position of a first hand in an electronic device is obtained in a case that a target interface is first displayed on a screen of the electronic device, where the target interface includes the first hand, a first preset unlocking condition corresponding to the first position is determined, an unlocking input performed a user is received, and the electronic device is unlocked in response to the unlocking input in a case that the unlocking input matches the first preset unlocking condition. In this embodiment of this application, the unlocking condition is combined with the hand on the target interface of the electronic device, so that unlocking is diversified and an unlocking process is more interesting, thereby improving user experience.

It should be understood that, in this embodiment of this application, the input unit 1604 may include a Graphics Processing Unit (GPU) 16041 and a microphone 16042, and the graphics processing unit 16041 processes image data of a still picture or a video obtained by an image capture apparatus (such as a camera) in a video capture mode or an image capture mode. The display unit 1606 may include a display panel 16061. In some embodiments, the display panel 16061 may be configured in a form such as a liquid crystal display or an organic light-emitting diode. The user input unit 1607 includes a touch panel 16071 and another input device 16072. The touch panel 16071 is also referred to as a touchscreen. The touch panel 16071 may include two parts: a touch detection apparatus and a touch controller. The another input device 16072 may include but is not limited to a physical keyboard, a functional button (such as a volume control button or a power on/off button), a trackball, a mouse, and a joystick. Details are not described herein. The memory 1609 may be configured to store a software program and various data, including but not limited to an application and an operating system. An application processor and a modem processor may be integrated into the processor 1610, the application processor mainly processes an operating system, a user interface, an application, and the like, and the modem processor mainly processes wireless communication. It can be understood that the modem processor may not be integrated into the processor 1610.

An embodiment of this application further provides a readable storage medium. The readable storage medium stores a program or an instruction, and the program or the instruction is executed by a processor to implement the processes of the screen unlocking method embodiment provided in any one of the foregoing embodiments and a same technical effect can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing screen unlocking method embodiment and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A screen unlocking method, comprising:
obtaining a first position of a first hand when a target interface is displayed on a screen of an electronic device, wherein the target interface comprises the first hand;
determining a first preset unlocking condition corresponding to the first position, wherein the first preset unlocking condition comprises a first preset track corresponding to the first position for unlocking the electronic device;
receiving an unlocking input performed by a user;
determining a moving track on the screen of the electronic device formed by the unlocking input from a moment the user touches the screen to a moment the user leaves the screen; and
unlocking the electronic device in response to the unlocking input when the unlocking input moving track matches the first preset track.

2. The screen unlocking method according to claim 1, wherein the target interface comprises a watch face, and the first position is a position of the first hand in the watch face; and
after obtaining the first position of the first hand, the method further comprises:
determining an interval in which the first position is located, wherein the watch face comprises a plurality of intervals, the intervals correspond to different preset unlocking tracks, and the preset unlocking tracks comprise the first preset track.

3. The screen unlocking method according to claim 1, wherein the first hand comprises a first sub-hand and a second sub-hand, and the first position is a relative position between the first sub-hand and the second sub-hand; and determining the first preset unlocking condition corresponding to the first position comprises:

determining an included angle between the first sub-hand and the second sub-hand according to the relative position between the first sub-hand and the second sub-hand; and determining the first preset track corresponding to the first position according to the included angle.

4. The screen unlocking method according to claim 3, wherein the included angle comprises a first included angle and a second included angle, and a sum of the first included angle and the second included angle is 360°; and after unlocking the electronic device, the method further comprises:

displaying a first interface when the included angle is the first included angle; or displaying a second interface when the included angle is the second included angle, wherein the first preset unlocking condition comprises the first preset track and a second preset track, the first included angle corresponds to the first unlocking condition, and the second included angle corresponds to the second unlocking condition.

5. The screen unlocking method according to claim 1, wherein before unlocking the electronic device in response to the unlocking input when the moving track matches the first preset track, the method further comprises:

obtaining input duration of the unlocking input; and keeping the electronic device in a locked state when the input duration is greater than preset duration; or detecting matching between the moving track and the first preset track when the input duration is less than or equal to the preset duration.

6. An electronic device, comprising: a memory storing a computer program; and a processor coupled to the memory and configured to execute the computer program to perform operations comprising:

obtaining a first position of a first hand when a target interface is displayed on a screen of the electronic device, wherein the target interface comprises the first hand;

determining a first preset unlocking condition corresponding to the first position, wherein the first preset unlocking condition comprises a first preset track corresponding to the first position for unlocking the electronic device;

receiving an unlocking input performed by a user;

determining a moving track on the screen of the electronic device formed by the unlocking input from a moment the user touches the screen to a moment the user leaves the screen; and unlocking the electronic device in response to the unlocking input when the unlocking input moving track matches the first preset track.

7. The electronic device according to claim 6, wherein the target interface comprises a watch face, and the first position is a position of the first hand in the watch face; and after obtaining the first position of the first hand, the operations further comprise:

determining an interval in which the first position is located, wherein the watch face comprises a plurality of intervals, the intervals correspond to different preset tracks, and the preset unlocking tracks comprise the first preset track.

8. The electronic device according to claim 6, wherein the first hand comprises a first sub-hand and a second sub-hand, and the first position is a relative position between the first sub-hand and the second sub-hand; and determining the first preset unlocking condition corresponding to the first position comprises:

determining an included angle between the first sub-hand and the second sub-hand according to the relative position between the first sub-hand and the second sub-hand; and determining the first preset track corresponding to the first position according to the included angle.

9. The electronic device according to claim 8, wherein the included angle comprises a first included angle and a second included angle, and a sum of the first included angle and the second included angle is 360°; and after unlocking the electronic device, the operations further comprise:

displaying a first interface when the included angle is the first included angle; or displaying a second interface when the included angle is the second included angle, wherein the first preset unlocking condition comprises the first preset track and a second preset track, the first included angle corresponds to the first unlocking condition, and the second included angle corresponds to the second unlocking condition.

10. The electronic device according to claim 6, wherein before unlocking the electronic device in response to the unlocking input when the moving track matches the first preset track, the operations further comprise:

obtaining input duration of the unlocking input; and keeping the electronic device in a locked state when the input duration is greater than preset duration; or detecting matching between the moving track and the first preset track when the input duration is less than or equal to the preset duration.

11. A non-transitory computer-readable storage medium, storing a computer program, wherein the computer program, when executed by a processor, causes the processor to perform operations comprising:

obtaining a first position of a first hand when a target interface is displayed on a screen of an electronic device, wherein the target interface comprises the first hand;

determining a first preset unlocking condition corresponding to the first position, wherein the first preset unlocking condition comprises a first preset track corresponding to the first position for unlocking the electronic device;

receiving an unlocking input performed by a user;

determining a moving track on the screen of the electronic device formed by the unlocking input from a moment the user touches the screen to a moment the user leaves the screen; and unlocking the electronic device in response to the unlocking input when the unlocking input moving track matches the first preset track.

12. The non-transitory computer-readable storage medium according to claim 11, wherein the target interface comprises a watch face, and the first position is a position of the first hand in the watch face; and after obtaining the first position of the first hand, the operations further comprise:

determining an interval in which the first position is located, wherein the watch face comprises a plurality of intervals, the intervals correspond to different preset tracks, and the preset unlocking tracks comprise the first preset track.

13. The non-transitory computer-readable storage medium according to claim 11, wherein the first hand comprises a first sub-hand and a second sub-hand, and the first position is a relative position between the first sub-hand and the second sub-hand; and determining the first preset unlocking condition corresponding to the first position comprises:

determining an included angle between the first sub-hand and the second sub-hand according to the relative position between the first sub-hand and the second sub-hand; and determining the first preset track corresponding to the first position according to the included angle.

14. The non-transitory computer-readable storage medium according to claim 13, wherein the included angle comprises a first included angle and a second included angle, and a sum of the first included angle and the second included angle is 360°; and after unlocking the electronic device, the operations further comprise:

displaying a first interface when the included angle is the first included angle; or displaying a second interface when the included angle is the second included angle, wherein the first preset unlocking condition comprises the first preset track and a second preset track, the first included angle corresponds to the first unlocking condition, and the second included angle corresponds to the second unlocking condition.

15. The non-transitory computer-readable storage medium according to claim 11, wherein before unlocking the electronic device in response to the unlocking input when the moving track matches the first preset track, the operations further comprise:

obtaining input duration of the unlocking input; and keeping the electronic device in a locked state when the input duration is greater than preset duration; or detecting matching between the moving track and the first preset track when the input duration is less than or equal to the preset duration.

* * * * *